Feb. 26, 1929.
B. W. JONES
1,703,486
ELECTROMAGNETICALLY OPERATED APPARATUS
Original Filed June 6, 1924
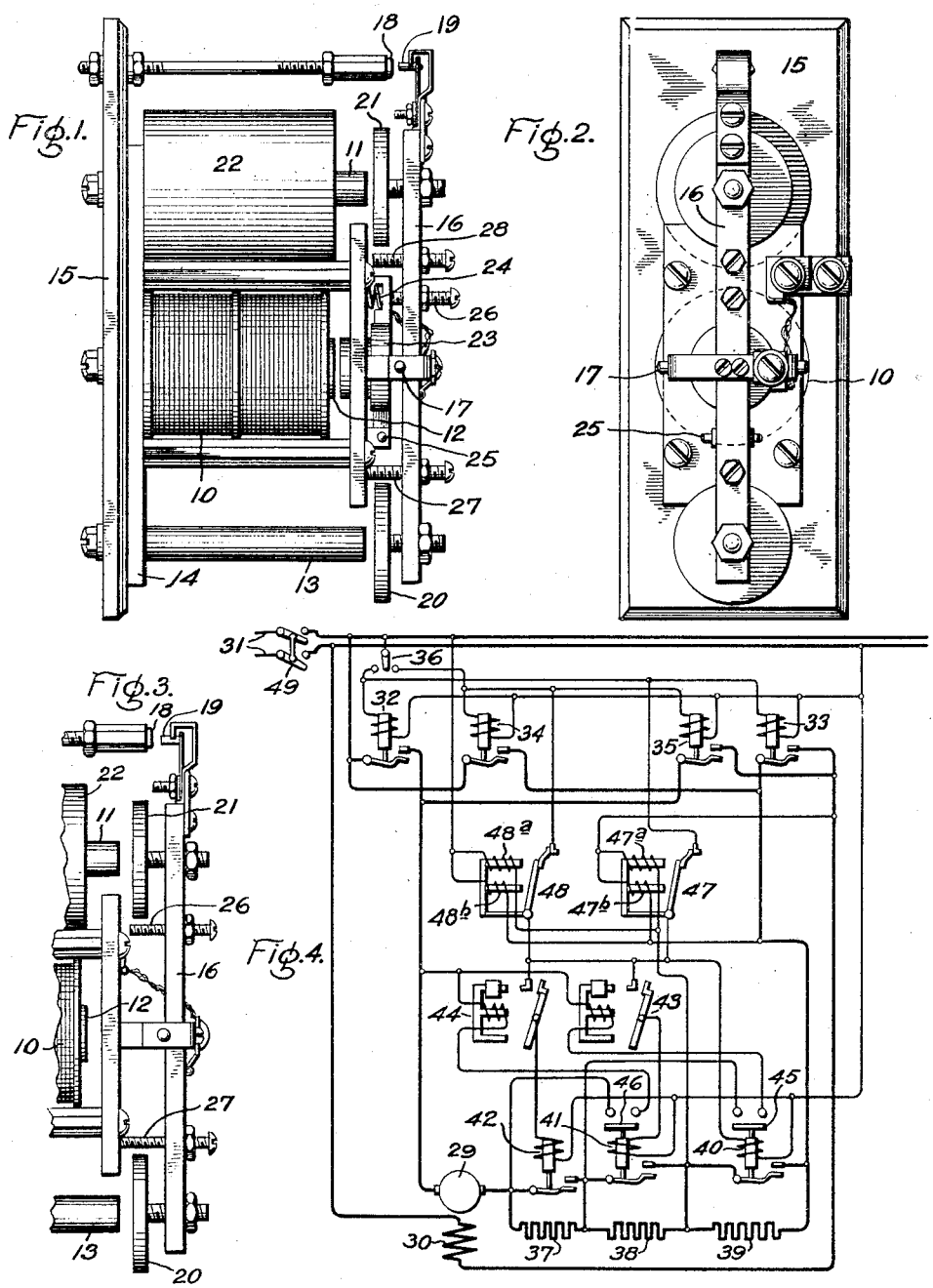
Inventor:
Benjamin W. Jones,
by
His Attorney Patented Feb. 26, 1929.

1,703,486

UNITED STATES PATENT OFFICE.

BENJAMIN W. JONES, OF SCHENECTADY, NEW YORK, ASSIGNOR TO GENERAL ELECTRIC COMPANY, A CORPORATION OF NEW YORK.

ELECTROMAGNETICALLY-OPERATED APPARATUS.

Original application filed June 6, 1924, Serial No. 720,209. Divided and this application filed October 20, 1922. Serial No. 595,875.

My invention relates to improvements in electroresponsive devices and one of the objects of the invention is to provide an improved electro-responsive device which shall operate responsively to the rate of change of the current in the energizing winding of the device so that the device shall be held from operating while the rate of change of the current is comparatively high and shall be magnetically operated when the rate of change of the current through the winding diminishes to a predetermined value.

A further object of the invention is to provide a magnetically operated device which when energized by a varying current sets up two forces with respect to a movable mechanism, one of the forces being an actuating force tending to move the mechanism and the other an opposing force tending to prevent the movement of the same, the opposing force predominating when the rate of change of the energizing current is comparatively high and the actuating force predominating to move the mechanism when the rate of change of the energizing current diminishes to a predetermined value.

A further object of the invention is to provide an improved electroresponsive device which shall operate in accordance with the rate of change of the energizing current independently of the instantaneous value of the current.

Motor control systems have heretofore been proposed in which the acceleration of the motor is under the control of switch mechanism controlled responsively to the rate of change of a motor operating condition, such as the rate of change of the current taken by the motor, or the rate of change of the motor counter-electromotive force, or the rate of change of the voltage drop across an accelerating resistor. Such systems have involved the use of a reactance, such for example as a transformer, the primary of which is connected in or to the motor circuit, and switch mechanism for controlling the motor is energized from the secondary of the transformer.

A still further object of the invention is to provide electromagnetic motor controlling switches which have inherent characteristics when connected in circuit with the motor that the switches operate in accordance with the rate of change of a motor operating condition.

These and other objects which will either be explained fully hereinafter or be obvious to those skilled in the art are attained by the electromagnetic circuit controlling apparatus illustrated in the accompanying drawings.

For a better understanding of the invention, reference is had to the accompanying drawings in which I have shown my invention embodied in concrete form for purposes of explaining the principles of the invention, and in which Fig. 1 is a side view of one form of an electroresponsive device constructed in accordance with the invention; Fig. 2 is a front view of the same; Fig. 3 is a side view of a part of an electroresponsive device similar to the device of Figs. 1 and 2, but of a simpler form; and Fig. 4 is a very simplified diagram of a motor control system employing electroresponsive devices of the invention as electromagnetic relays for the control of motor controlling switches.

Referring to the drawings, the electromagnetic device embodying the invention as shown in Figs. 1 and 2 takes the form of an electromagnetic switch or relay having an energizing winding 10 mounted on the middle of the three aligned legs 11, 12 and 13 of a magnet structure for the device. The legs or pole pieces 11, 12 and 13 of the magnetic circuit of the device are connected to each other by means of a plate 14 of magnetic material, and the various parts of the device are mounted upon a base 15 of insulating material. The armature 16 is pivotally mounted at 17 adjacent the middle leg 13 of the magnetic structure. This armature is acted upon by the flux set up by the magnet winding 10 so as to produce at least two magnetic forces, one of which predominates to hold the armature in the biased position shown in the drawing as long as the current in the energizing winding is changing at a substantial rate, and the other of which predominates when the current in the energizing winding becomes either substantially constant or when the rate of change of the current has diminished to a predetermined value to actuate the armature 16 and thereby close the circuit controlling contacts 18 and 19. The lower end of the armature 16 is provided with an adjustable armature 20 which cooperates with the pole 13, and the upper end of the armature 16 is provided with an adjustable armature 21 which cooperates with the pole 11. Mounted on the pole 11 is a non-magnetic electric conducting sleeve 22 which plays a very important part in the functioning of my electromagnetic device. When the current through the energizing winding 10 varies, the sleeve 22 acts as a short circuited conductor to set up a magnetic flux in opposition to the magnetic flux set up by the winding 10 in the pole 11. This has the effect of forcing the magnetic flux set up by the winding 10 through the pole 13 and thereby causing the magnetic attraction on the armature 16 to be principally on the lower side of the pivot point 17 while the energizing current of the winding varies at a substantial rate. This will cause the armature 16 to be held in its biased position until the current through the energizing winding becomes substantially constant, whereupon the effect of the flux retarding device 22 becomes negligible and the magnetic force which tends to close the switch contacts 18 and 19 will predominate over the magnetic force of the flux through the pole 13. It will be observed that as long as the energizing current of the magnet winding is varied, the short circuited conductor 22 will retard the building up of the flux in the pole 11, but that as soon as the current in the magnet winding becomes substantially constant, or the rate of change of the current has diminished to a predetermined value, the short circuited conductor 22 will have practically no effect on the distribution of the flux. The flux set up by the magnet winding will divide between the paths 11 and 13 in accordance with the reluctance of the paths. The pole piece 20 may be adjusted with respect to the end of the pole 13 so that the air gap will be slightly larger than the air gap between the pole piece 21 and the end of the pole 11. This is to insure that the switch will be positively held in the open position until it is desired that the switch shall close. The device is preferably designed so as to have an inherent time function which corresponds to the rate of change of the energizing current.

Although an electroresponsive device as constructed and arranged in Figs. 1 and 2 is entirely operative without any special provision for positively biasing the armature 16 so that it will be held in its biased position until the current through the magnet winding becomes substantially constant, nevertheless I have provided an auxiliary armature 23 which is biased away from the end of the pole 12 by means of a spring 24. This auxiliary armature is pivotally mounted at 25 and its upper end cooperates with an adjustable stop 26 carried by the armature 16, so that as long as the magnet winding is not energized, the armature 16 will be positively biased to the position shown in the drawing. As soon as the magnet winding is energized, the armature 23 is attracted to neutralize the biasing effect of the spring 24, so that the armature 16 may be moved to its second position when the current through the winding 10 becomes substantially constant, or the rate of change of the current has diminished to a predetermined value substantially independently of the instantaneous value of the current. When the magnet winding is de-energized the auxiliary armature operates to restore the armature 16 to the position shown in Figure 1. The stop 27 is provided for limiting the movement of the armature 16 toward the magnet pole 13, and the stop 28, also carried by the armature 16, is provided for limiting the closing movement of the armature 16. The arrangement is preferably such that after the auxiliary armature is operated to release the armature 16, the armature 16 is in balance except for the effect of the magnetic forces on the same.

In Fig. 3 I have shown a form of my improved electroresponsive device in which the auxiliary armature 23 is eliminated. In this arrangement the armature 16 is biased by gravity to the open position of the switch contacts 18 and 19 and is held in this biased position until the current through the magnet winding is substantially constant or the rate of change of the current has diminished to a predetermined value in the same manner as the device of Figures 1 and 2. As will be apparent to those skilled in the art, the device may take different forms than those previously explained.

Although not necessarily limited thereto, my improved electroresponsive device has a particular application in the control of electric motors. When an electric motor is connected to the supply circuit, there is a comparatively heavy rush of current which rises in value from a zero value to a maximum in a certain short interval of time, and then drops from the maximum value to a substantially constant value in a longer interval of time. The time taken for the current to pass from the peak value to the substantially constant value is determined by the length of time required for the counter-electromotive force of the motor to build up to a substantially constant value. The motor current also varies in a similar manner when a resistor switch is closed to accelerate the motor. There is thus a changing condition of the motor, either the changing of the motor current or the changing of the counter electromotive force, which may be used as the controlling influence in effecting the starting or other regulation of the motor. A system of control which takes advantage of the rate of change of a motor operating condition as the controlling influence in regulating the motor and which is independent of the instantaneous value of either the motor current, the counter electromotive force of the motor, or the selected condition of the motor, is inherently correct for certain applications of motor control. For example, in the control of a steel mill auxiliary motor, where the load on the motor varies materially from time to time and it is desired in all events that, within the capabilities of the motor, the motor shall start regardless of the load, the system of the present invention has a particular application. It has heretofore been common practice to control the starting of a motor in accordance with the current taken by the motor. Such an arrangement leaves something to be desired because of the fact that if the current limit setting is such that it will take care of the extreme conditions, the setting of the current limit device will be too high for the ordinary conditions encountered, and the motor controlled may thereby be injured by being required to accelerate at all times in accordance with a condition which may happen very seldom. In case the acceleration of the motor is in accordance with the operation of a time limit device, and the time limit device is set to take care of the extreme condition, the acceleration of the motor will take entirely too long for the ordinary conditions encountered, and in case the time limit device is set for the ordinary conditions encountered, the acceleration will be at too rapid a rate for the proper protection of the motor under the extreme conditions. Combined current limit and time limit automatic starting arrangements have heretofore been proposed, but these have all involved undesirable complications from an operative standpoint and have left something to be desired in the way of simplicity and reliability of operation. My present invention makes use of the rate of change of a condition of the motor or the motor circuits as the proper controlling function for starting and regulating the speed of the controlled motor.

In Fig. 4 I have shown in very simplified diagram a reversing motor control system in which the electroresponsive devices of Figs. 1, 2 and 3 take the form of electromagnetic relays for the control of starting resistor contactors for an electric motor. As will be explained fully hereinafter, my invention is not necessarily limited to applications employing relays for the control of contactors, since the electroresponsive device of the invention may also be used as the resistor contactor itself. Referring to Fig. 4, the electric motor 29 having a series field 30 is adapted to be connected to the supply circuit 31 by means of the line contactors 32 and 33 for forward operation and by means of the line contactors 34 and 35 for reverse operation. The reversing pilot or master switch 36 controls the energization of the aforesaid line contactors. The motor starting resistors 37, 38 and 39 are connected in the motor armature circuit so as to regulate the motor at starting. The resistor contactor 40 is provided for short circuiting the resistor 39, the contactor 41 for short circuiting the resistor 38, and the contactor 42 for short circuiting he resistor 37. The relay 43 is provided for controlling the energization of the contactor 41 and the relay 44 is provided for controlling the energization of the contactor 42. These relays are of the type shown in Figs. 1 to 3 inclusive, and the relay is shown in very diagrammatic form merely to indicate in a control system the nature of the relay intended to be used. The energizing winding of the relay 43 is controlled by an auxiliary switch 45 on the resistor contactor 40, and the energizing winding of the relay 44 is controlled by an auxiliary switch 46 of the resistor contactor 41. The connections are such that after the resistor contactor 40 is closed, the relay 43 is connected across the motor armature and the resistor 37, so that the relay is energized in accordance with the counterelectromotive force of the motor which varies in the manner heretofore explained. The connections are also such that when the resistor contactor 41 is closed by the operation of the relay 43, the winding of the relay 44 is connected across the motor armature so as to be energized in accordance with the counterelectromotive force of the motor. For certain applications, I find it advisable to employ voltage drop control relays for controlling the "plugging" or stopping of the motor upon reversal in a manner described and broadly claimed in an application for patent by myself and Eugene R. Carichoff, Serial No. 527,520, filed January 6, 1922, a renewal of an application Serial No. 354,020, filed January 26, 1920. The particular construction of the relay is as disclosed and claimed in a patent to myself and Eugene R. Carichoff, No. 1,500,800, dated July 8, 1924. The resistor contactor 40 is controlled by the voltage drop relays 47 and 48. The relay 47 is connected so as to be operative to control the resistor contactor 40 for forward operation; that is, when the line contactors 32 and 33 are closed, and the relay 48 is provided for controlling the resistor contactor 40 for reverse operation, that is, when the line contactors 34 and 35 are closed. The operation of my invention as thus constructed and arranged and with the parts in their respective positions shown in the drawing, is as follows:—

The disconnecting switch 49 will first be closed. The windings of the voltage drop relays 47 and 48 will then be connected in series relation across the supply circuit 31:—thus, the upper winding $48^a$ will be connected in series with the upper winding $47^a$, and the winding $48^b$ on the middle leg of the magnetic structure of the relay 48 will be connected in series with the winding $47^b$ on the middle leg of the magnetic structure of the relay 47. The relays 47 and 48 will thus be energized to open their circuit controlling contacts. Assume that it is desired to operate the motor in the forward direction, the pilot switch 36 will be thrown to its left hand position, thereby energizing the line contactors 32 and 33 to close and establishing a circuit for the motor which includes the contacts of line contactor 32, motor armature, resistors 37, 38 and 39, line contactor 33, series field 30, to the other conductor of the supply circuit. It will be noticed that when the line contactor 33 closes, the winding 47$^b$ of the relay 47 will be short circuited, so that the control of the closing of the relay 47 will be given to the winding 47$^a$, and it will also be noticed that the winding 47$^a$ is now connected across the resistor 39. It will also be noticed that the closing of the line contactor 33 connects the winding 48$^b$ of the relay 48 directly across the supply circuit (through the series field 30), and the winding 48$^a$ is connected across the motor armature and the starting resistors 37 and 38, so that the relay 48 will be energized to remain open. The resistor 39 which is used principally to protect the motor during "plugging" will be of a comparatively high value of resistance and the setting of the relays 47 and 48 will be such that the contactor 40 will be positively operated to close for all loads which would be expected to be encountered by the motor 29 in starting. The resistor 39 has an important function in starting in limiting the torque of the motor to a comparatively low value so that shocks to the machine driven thereby are prevented. When the back-lash between gearing has been taken up and the static friction of the parts has been broken, the torque of the motor may be materially increased so as to take up the load gradually. In this manner the motor is positively started unless a dangerous condition is present, but the initial torque of the motor is reduced to the proper value. After an interval the winding 47$^a$ of the relay 47 will permit the switch member of the relay to return to its closed or biased position, so as to thereby energize the resistor contactor 40 to close. The relay 48 will be maintained open in the manner previously explained. When the resistor contactor 40 closes, the winding of the rate of change relay 43 will be connected across the motor armature and the resistor 37. The counterelectromotive force of the motor will gradually increase as the motor accelerates. As long as the counter-electromotive force of the motor is changing, the relay 43 will operate to hold its armature in the open position of the switch contacts controlled thereby, in the manner explained in connection with the electromagnetic device of Figs. 1, 2 and 3. When the counter-electromotive force of the motor becomes substantially constant and thus the current supplied to the energizing winding of the relay 43 becomes substantially constant, or when the rate of change of the energizing current diminishes to a predetermined value, the relay will close in the manner explained in connection with Figs. 1, 2 and 3 so as to energize the resistor contactor 41 to close. The resistor contactor 41 will short circuit the starting resistor 38 and also energize the winding of the rate of change relay 44, the winding of the relay 44 being connected across the motor armature so as to be energized in accordance with the counter-electromotive force of the motor. The short circuiting of the starting resistor 38 will cause the motor to increase in speed and build up a higher counter-electromotive force. The counter-electromotive force will rise in value gradually until a substantially constant value is reached, at which the relay 44 will close its contacts and energize the resistor contactor 42 to close and short circuit the starting resistor 37, thus connecting the motor directly to the supply circuit. If it is now desired to reverse the motor, the pilot or master switch 36 will be thrown from its left hand position to its right hand position, thereby deenergizing the line contactors 32 and 33 and energizing the line contactors 34 and 35 to close. It will be remembered that the relay 48 was maintained energized so that the contacts controlled thereby were maintained in the open position. As soon as the master switch 36 is moved from its left hand position to its neutral or off position, the windings of the voltage drop relays 47 and 48 will again be connected in series relation across the supply circuit so that the relay 47 will be again open. It will be noticed that when the line contactor 34 closes, it short circuits the winding 48$^b$ of relay 48, and that the winding 48$^a$ is connected across the resistor 39, so that the closing of the relay 48 will be under the control of the winding 48$^a$. The winding 47$^a$ of the relay 47 will be connected across the motor armature and the resistors 37 and 38, and the winding 47$^b$ will be connected across the supply circuit, so that this relay 47 will be maintained open in the same manner that the relay 48 was maintained open when the motor was being operated in the forward direction. The resistor 39 provides a protection for the motor when the motor is "plugged," so that the motor may be reversed from full speed operation in one direction to operation in the other direction. The current through the motor armature will reverse in direction, and when the current taken by the motor during the interval of plugging is reduced to such a value that the winding 48$^a$ will permit the switch member of the relay 48 to return to its closed position, the resistor contactor 40 will be closed. The acceleration of the motor is then placed under the control of the rate-of-change relays 43 and 44 in the manner previously explained in connection with the forward operation of the motor.

While I have shown my invention as applied to a system of motor control, broadly speaking, the invention is not necessarily limited to motor control, since I conceive that an electro-responsive device constructed in accordance with the invention has other applications than in systems of motor control. Furthermore, while I have shown my invention as applied to systems of motor control in which control of the motor is in accordance with the rate of change of the counter-electromotive force of the motor, I would have it understood that the counter-electromotive force of the motor is only one of several changing conditions which may be used as the controlling condition for governing the acceleration of the controlled motor. The system of motor control shown in Fig. 4 of this application is claimed in a divisional application, Serial No. 720,209, filed June 6, 1924.

In accordance with the provisions of the patent statutes, I have described the principles of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is,—

1. A controlling device for electric circuits comprising a switch member biased to one position and movable to a second position, and electromagnetic means energized by a varying current which magnetically unbiases the switch member and simultaneously prevents the switch member from operating to the second position when the rate of change of the energizing current of the said electromagnetic means is relatively high and which magnetically operates the unbiased switch member to the second position when the rate of change of the energizing current diminishes to a predetermined value.

2. A controlling device for electric circuits comprising a switch member biased to one position, electromagnetic means energized by a varying current which neutralizes the bias and magnetically holds the switch in said one position when the rate of change of the current is relatively high but which maintains the bias neutralized and magnetically operates the switch member to a second position independently of the instantaneous value of the energizing current when the value of the energizing current becomes substantially constant.

3. In a magnetically operated device, a magnetic movable mechanism biased to one position, an electromagnet energized by a varying current which sets up a magnetic force with respect to the movable mechanism to neutralize the bias and simultaneously hold the mechanism in the biased position while the rate of change of the energizing current is comparatively high and which maintains the bias neutralized and sets up a magnetic force to operate the said mechanism to a second position independently of the instantaneous value of the energizing current when the rate of change of the energizing current diminishes to a predetermined value.

4. In a magnetically operated device, a movable mechanism normally biased against movement, an electromagnet energized by a varying current which neutralizes the bias and simultaneously sets up two forces with respect to said movable mechanism, one an actuating force tending to move the movable mechanism and the other an opposing force tending to prevent the same, and means responsive to the rate of change of the energizing current of said electromagnet whereby the opposing force predominates when the rate of change of the energizing current is comparatively high and the actuating force predominates to move the movable mechanism when the rate of change of the energizing current diminishes to a predetermined value.

5. A magnetically operated device comprising a pivoted member biased to one position and movable to a second position and having an armature portion on each side of the pivot, an electromagnet for neutralizing the bias of said member and simultaneously acting on one of said armature portions to operate the said pivoted member to a second position and on the other armature portion to hold it in the first position, and means responsive to the rate of change of the energizing current of said electromagnet for causing the holding force to predominate when the rate of change of the exciting current of the magnet is relatively high and the operating force to predominate to move the said pivoted member to the second position when the rate of change of the exciting current of the magnet diminishes to a predetermined value.

6. A magnetically operated device comprising a pivoted member biased to one position and having an armature portion on each side of the pivot, an electromagnet for neutralizing the bias of said member and simultaneously acting on one of said armature portions to operate the said pivoted member to a second position and on the other armature portion to hold it in the biased position, the operating force predominating when the rate of change of the exciting current diminishes to a predetermined value, and a short circuited non-magnetic conductor of low electrical resistance surrounding a portion of the magnetic circuit for retarding the increase of the operating force while the rate of increase of the exciting current of the magnet is relatively high, whereby the holding force predominates when the rate of increase of the exciting current of the magnet is comparatively high.

7. An electromagnetic switch comprising a movable switch member biased to one position, a magnetic circuit including a movable member for neutralizing the bias of the switch member and a second movable magnetic member for operating the said switch member and a winding for producing magnetic pulls on said second magnetic member at two places, said magnetic circuit having two parallel paths with the first magnetic member responsive to the flux in each path, the first of said paths having a short circuited conductor disposed thereon to cause the pulls on said second magnetic member to vary at the two places in accordance with the rate of change of the variation of the ampere turns in the winding of the switch electromagnet, the pull at one place predominating to hold the switch member in the biased position when the rate of change of the ampere turns of the said winding is relatively high and the pull at the other place predominating to move the switch member to another position independently of the instantaneous value of the ampere turns of said winding when the rate of change of the ampere turns of said winding diminishes to a predetermined value.

8. An electromagnetic switch comprising a movable switch member, a pivotally supported magnetic member for operating the said switch member between the open position and the closed position, an electromagnet having a magnetic structure with one leg opposite the pivotal support for the said magnetic member and two oppositely disposed legs cooperating with opposite ends of the said magnetic member, a winding on the said leg opposite the said pivotal support and a short circuited conductor on another leg, means including an auxiliary armature in attractive relation with said one leg for biasing one end of the said magnetic member toward the remaining leg with the switch member in the open position, the auxiliary armature being arranged to remove the bias and permit said pivoted magnetic member to magnetically hold the switch member in the open position while the current in the said winding is changing and to operate the switch member to the closed position when the rate of change of the current in the said winding diminishes to a predetermined value.

9. An electromagnetic switch comprising a movable switch member, a pivotally supported magnetic member for magnetically holding the switch member in the open position and for magnetically operating the switch member to the closed position, an electromagnet having a magnetic structure comprising three aligned legs, the middle leg having a winding thereon and disposed opposite the pivotal support for the said magnetic member, a non-magnetic metallic sleeve over another of the said legs, an auxiliary armature in attractive relation with said middle leg and biased into engagement with said first magnetic member to bias the switch member to the open position with one end of the said first magnetic member separated from the third leg by an air gap and the other end of the first magnetic member separated from the leg carrying the said sleeve by a smaller air gap, whereby the switch member is unbiased and magnetically held in the open position while the current in the said winding is changing and magnetically operated to the closed position when the current in the said winding substantially ceases to change, and means for varying the said air gaps to vary the magnetic holding open and closing forces.

10. In a magnetically operated device, a movable mechanism, means for normally biasing the said mechanism to one position, and an electromagnet which neutralizes the said biasing means and magnetically holds the said mechanism in the biased position while the rate of change of the energizing current of the electromagnet winding is relatively high and which magnetically operates the said mechanism to a second position due to the flux set up by said winding independently of the instantaneous value of the current when the rate of change of the energizing current diminishes to a predetermined value.

11. In a magnetically operated device, a movable mechanism, an armature biased to a position to cooperate with the said mechanism and bias the same to one position, and an electromagnet which attracts the said armature to release the biasing effect of the same on the said mechanism, and means responsive to the rate of change of the energizing current of the electromagnet winding cooperating with said electromagnet whereby said electromagnet holds the said mechanism in the biased position while the rate of change of the energizing current of the electromagnet winding is relatively high and magnetically operates the said mechanism to a second position when the rate of change of the energizing current diminishes to a predetermined value substantially independently of the instantaneous value of said energizing current.

12. In a magnetically operated device, an armature pivoted between its ends, an auxiliary magnetic member for normally biasing the said armature to one position, and an electromagnet which attracts the said magnetic member to release the biasing effect of the same on the said armature and set up two forces with respect to the armature, one an actuating force operating on one end of the armature and the other a holding force operating on the other end of the armature, the holding force predominating to hold the armature in the biased position while the rate of change of the energizing current of the magnet winding is relatively high and the actuating force predominating independently of the instantaneous value of the energizing current when the rate of change of the energizing current diminishes to a predetermined value.

In witness whereof, I have hereunto set my hand this 18th day of October, 1922.

BENJAMIN W. JONES.